(12) United States Patent
Okamoto et al.

(10) Patent No.: US 6,183,551 B1
(45) Date of Patent: Feb. 6, 2001

(54) CURABLE RESIN COMPOSITION

(75) Inventors: Toshihiko Okamoto; Kazuo Hagiwara; Makoto Chiba, all of Kobe; Masashi Sakaguchi, Kakogawa; Junji Takase, Akashi, all of (JP)

(73) Assignee: Kaneka Corporation, Osaka (JP)

( * ) Notice: Under 35 U.S.C. 154(b), the term of this patent shall be extended for 0 days.

(21) Appl. No.: 08/961,918

(22) Filed: Oct. 31, 1997

(30) Foreign Application Priority Data

Oct. 31, 1996 (JP) .................................................. 8-289493

(51) Int. Cl.[7] ...................................................... C09K 3/10
(52) U.S. Cl. ................ 106/287.12; 106/287.16; 524/858; 524/860; 524/863
(58) Field of Search ..................... 524/858, 860, 524/863; 528/12, 901; 106/287.12, 287.16

(56) References Cited

U.S. PATENT DOCUMENTS

| | | | | |
|---|---|---|---|---|
| 3,471,440 | * | 10/1969 | Ashby ................................. | 524/858 |
| 3,485,787 | | 12/1969 | Haefele et al. . | |
| 4,758,631 | | 7/1988 | Kennedy et al. ..................... | 525/245 |
| 4,826,904 | * | 5/1989 | Matsumura et al. ................. | 524/863 |
| 4,880,861 | * | 11/1989 | Matsumura et al. ................. | 524/863 |
| 4,904,732 | * | 2/1990 | Iwahara et al. ....................... | 525/100 |
| 5,354,210 | * | 10/1994 | Koblitx et al. ....................... | 549/276 |

FOREIGN PATENT DOCUMENTS

| | | |
|---|---|---|
| 0 252 372 | 6/1987 | (EP) . |
| 0 287 025 | 4/1988 | (EP) . |
| 1234034 | 6/1971 | (GB) . |
| 63-105005 | 5/1988 | (JP) . |
| 63-254149 | 10/1988 | (JP) . |
| 64-22904 | 1/1989 | (JP) . |
| 1-163255 | 6/1989 | (JP) . |
| 4-69659 | 11/1992 | (JP) . |
| 7-108928 | 11/1995 | (JP) . |
| 2539445 | 7/1996 | (JP) . |
| 8-209160 | 8/1996 | (JP) . |

OTHER PUBLICATIONS

Hawley, "Condensed Chemical Dictionary", p. 643, 1971.*

* cited by examiner

*Primary Examiner*—Robert Dawson
*Assistant Examiner*—D. Aylward
(74) *Attorney, Agent, or Firm*—Foley & Lardner

(57) ABSTRACT

A curable resin composition containing (A) a saturated hydrocarbon polymer having at least one reactive silicon-containing group in a molecule, and (B) a hydrogenated oligomer of an α-olefin, or a curable resin composition containing (A) a saturated hydrocarbon polymer having at least one reactive silicon-containing group in a molecule, (C) a saturated hydrocarbon oligomer, and (D) an ester plasticizer, both of which have good workability, in particular, at low temperature.

19 Claims, No Drawings

CURABLE RESIN COMPOSITION

BACKGROUND OF THE INVENTION

1. Field of the Invention the present invention relates to a curable resin composition comprising a saturated hydrocarbon polymer having at least one silicon-containing group which has at least one hydroxyl or hydrolyzable group bonded to a silicon atom and is crosslinkable through the formation of a siloxane bond (hereinafter referred to as a "reactive silicon-containing group").

2. Description of the Prior Art

It is known that saturated hydrocarbon polymers having at least one reactive silicon-containing group in a molecule have interesting properties that they are crosslinked through the formation of siloxane bonds which is associated with the hydrolysis of reactive silicon-containing groups with moisture even at room temperature, and provide rubbery cured materials. Such polymers are useful as sealing materials for construction or sealing materials for insulating glass units, since they have excellent heat resistance, water resistance, weather resistance and the like.

The sealing materials for construction are required to have good handling properties and workability, since they are applied at construction sites using caulking guns and the like. The sealing materials for insulating glass units are discharged using applicators, that is, apparatuses for discharging sealing materials, in factories for insulating glass units. In this case, good workability with good discharging properties is required for the sealing materials.

However, saturated hydrocarbon polymers such as polyisobutylene have high viscosity and thus low handling properties, when they are used as sealants such as the sealing materials for construction or insulating glass units. Thus, they are plasticized by the addition of hydrogenated polybutene, paraffinic oils, naphthenic oils, and the like. However, the use of such plasticizers may be associated with some problems, for example, large heating loss, insufficient plasticizing effects, low flowability at low temperature, etc. Because of the low flowability at low temperature, the sealing materials for construction, which have to be applied at the construction sites, are attended with low extrudability or workability in winter seasons.

SUMMARY OF THE INVENTION

An object of the present invention is to provide a curable resin composition comprising a saturated hydrocarbon polymer having a reactive silicon-containing group which has improved workability, in particular, at low temperature without deteriorating physical, adhesion and curing properties and storage stability of the composition.

According to the first aspect, the present invention provides a curable resin composition comprising:

(A) a saturated hydrocarbon polymer having at least one reactive silicon-containing group in a molecule, and (B) a hydrogenated oligomer of an α-olefin.

According to the second aspect, the present invention provides a curable resin composition comprising:

(A) a saturated hydrocarbon polymer having at least one reactive silicon-containing group in a molecule, (C) a saturated hydrocarbon oligomer, and (D) an ester plasticizer.

DETAILED DESCRIPTION OF THE INVENTION

A saturated hydrocarbon polymer contained in the curable resin composition of the present invention has, in a molecule, at least one silicon-containing group which has at least one hydroxyl or hydrolyzable group bonded to a silicon atom and is crosslinkable through the formation of a siloxane bond, that is, at least one reactive silicon-containing group.

The saturated hydrocarbon polymer means a polymer which contains substantially no carbon—carbon unsaturated bond except aromatic rings. Examples of the saturated hydrocarbon polymer are polyethylene, polypropylene, polyisobutylene, hydrogenated polybutadiene, hydrogenated polyisoprene, and the like.

A preferable example of the reactive silicon-containing group is a group of the formula (1):

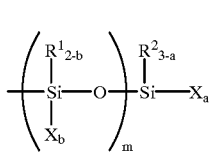

(1)

wherein $R^1$ and $R^2$ are the same or different and represent a hydrogen atom, a $C_{1-20}$ alkyl group, a $C_{6-20}$ aryl group, a $C_{7-20}$ aralkyl group or a triorganosiloxy group of the formula: $(R')_3SiO$— in which three R' groups are the same or different and represent a hydrogen atom or a $C_{1-20}$ alkyl group which may be substituted with, for example, a halogen atom, $C_{6-20}$ aryl group, and the like; the X groups are the same or different and represent a hydroxyl group or a hydrolyzable group; a is 0, 1, 2 or 3; and b is 0, 1 or 2, provided that the sum of a and b is not 0; and m is an integer of 0 to 19.

The hydrolyzable group may be any conventional hydrolyzable group, and examples of such a group are a hydrogen atom, an alkoxy group, an acyloxy group, a ketoxymate group, an amino group, an amido group, an aminoxy group, a mercapto group, an alkenyloxy group, and the like.

Among them, the alkoxy, amido and aminoxy groups are preferable. In particular, the alkoxy group is preferable in view of its mild hydrolyzability and easy handling.

One, two or three hydrolyzable groups and/or hydroxyl groups can be attached to one silicon atom, and the total number of the hydrolyzable groups and/or hydroxyl groups, that is, (a+mb) is preferably between 1 and 5. When two or more hydrolyzable or hydroxyl groups are present in the reactive silicon-containing group, they may be the same or different.

The reactive silicon-containing group contains at least one silicon atom. When the silicon atoms are bonded through siloxane bonds or the like, the number of silicon atoms is preferably 20 or less. In particular, a reactive silicon-containing group of the formula (2):

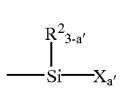

(2)

wherein $R^2$ and X are the same as defined above and a' is 1, 2 or 3, is preferable, because of easy availability.

The saturated hydrocarbon polymer contains at least one reactive silicon-containing group, preferably 1.1 to 5 reactive silicon-containing groups in a molecule on the average. When the number of the reactive silicon-containing group in a molecule is less than one, the composition tends to have insufficient curing properties, and thus the cured material may not have good rubbery elasticity.

The reactive silicon-containing group(s) may be bonded to an end or an internal part of each polymer chain of the saturated hydrocarbon polymer, or both. The reactive silicon-containing groups are preferably bonded to the ends of polymer chains, since they can maximize the chain length between cross-linking sites in the final cured material. Thus, a rubbery cured material having high strength and large elongation is easily obtained.

The saturated hydrocarbon polymers may be used independently or in admixture of two or more of them.

The polymer which constitutes the backbone of the saturated hydrocarbon polymer having the reactive silicon-containing group may be prepared by any conventional polymerization method. For example, such a polymer can be prepared by (1) polymerizing a $C_{1-6}$ olefin such as ethylene, propylene, 1-butene, isobutylene, etc. as a main monomer, or (2) polymerizing a diene compound such as butadiene, isoprene, etc. or copolymerizing such a diene compound with the above olefin, and then hydrogenating the polymer.

Among the polymers, isobutylene polymers and hydrogenated polybutadiene polymers are preferred, since functional groups are easily introduced at the polymer chain ends, their molecular weights can be easily controlled and the number of the functional groups to be introduced is increased.

Isobutylene polymers may consist of isobutylene repeating units. Alternatively, the isobutylene polymers may contain 50 wt. % or less, preferably 30 wt % or less, more preferably 10 wt. % or less of comonomeric repeating units.

Examples of the comonomer which may be copolymerized with isobutylene are $C_{4-12}$ olefins, vinyl ethers, aromatic vinyl compounds, vinylsilanes, allylsilanes, and the like. Specific examples of the comonomers are 1-butene, 2-butene, 2-methyl-1-butene, 3-methyl-1-butene, pentene, 4-methyl-1-pentene, hexane, vinylcyclohexene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, δ-methacryloyloxypropyltrimethoxysilane, δ-methacryloyloxypropylmethyldimethoxysilane, and the like.

When vinylsilanes or allylsilanes are used as comonomers to be copolymerized with isobutylene, the content of silicon atoms in the copolymer increases and thus the number of groups which act as silane-coupling sites increases. Therefore, the adhesion properties of the resulting composition improve.

The hydrogenated polybutadiene or other saturated hydrocarbon polymers may comprise other repeating units in addition to the main repeating units as in the case of the above isobutylene polymers.

the saturated hydrocarbon polymer having the reactive silicon-containing groups may comprise a small amount, preferably 10 wt % or less, more preferably 5% or less, in particular 1 wt. % or less, of repeating units having a double bond after polymerization, which are derived from polyene compounds, for instance, butadiene, isoprene and the like.

The number average molecular weight of the saturated hydrocarbon polymer, preferably isobutylene or hydrogenated polybutadiene polymers is preferably between 500 and 50,000, more preferably between 1000 and 20,000, in which range the polymers are in a liquid state or have flowability and thus their handling is easy.

Now, the preparation of the saturated hydrocarbon polymer having the reactive silicon-containing groups will be explained.

Among the isobutylene polymers having the reactive silicon-containing groups, isobutylene polymers having the reactive silicon-containing groups at the chain ends can be prepared using isobutylene polymers having functional groups at chain ends, preferably at all the chain ends, which has been prepared by cationic polymerization using special compounds which are so-called inifers and function as initiators and chain transfer agents (inifer method). For example, polyisobutylene having unsaturated groups at chain ends is prepared by dehydrohalogenation of such a polymer or the introduction of unsaturated groups to such a polymer as described in JP-A-63-105005 (=U.S. Pat. No. 4,758,631). Then, a hydrosilane compound of the formula:

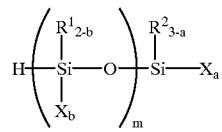

wherein $R^1$, $R^2$, X, a and b are the same as defined above, preferably, a hydrosilane compound of the formula:

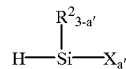

wherein $R^2$, X and a' are the same as defined above is added to polyisobutylene having the unsaturated groups at the chain ends in the presence of platinum catalysts by a so-called hydrosilylation reaction, and thus the reactive silicon-containing groups are introduced into the polymer.

Such methods are described in JP-B-4-69659 (=EP-A-0 252 372), JP-B-7-108928 (=EP-A-0 252 372), JP-A-63-254149 (=EP-A-0 287 025), JP-A-64-22904 and Japanese Patent No. 2539445.

Examples of the hydrosilane compounds used in the above methods are halogenated silanes (e.g. trichlorosilane, methyldichlorosilane, dimethylchlorosilane, phenyldichlorosilane, etc.); alkoxysilanes (e.g. trimethoxysilane, triethoxysilane, methyldiethoxysilane, methyldimethoxysilane, phenyldimethoxysilane, etc.); acyloxysilanes (e.g. methyldiacetoxysilane, phenyldiacetoxysilane, etc.); ketoximatesilanes (e.g. bis (dimethylketoximate)-methylsilane, bis (cyclohexylketoximate)methylsilane, etc.); and the like. Among them, halogenated silanes and alkoxysilanes are preferable.

Isobutylene polymers having the reactive silicon-containing groups in the internal parts of the polymer chains can be prepared by copolymerizing vinylsilans or allylsilanes having at least one reactive silicon-containing group with a monomer comprising isobutylene.

Furthermore, isobutylene polymers having the reactive silicon-containing groups at the chain ends and also in the internal parts of the polymer chains can be prepared by polymerizing isobutylene in the presence of vinylsilanes or allylsilanes having at least one reactive silicon-containing group and then introducing the reactive silicon-containing groups at the chain ends in the same method as described above.

Examples of the vinylsilane or allylsilanes having the reactive silicon-containing group are vinyltrichlorosilane, vinylmethyldichlorosilane, vinyldimethylchlorosilane, vinyldimethylmethoxysilane, divinyldichlorosilane, divinyldimethoxysilane, allytrichlorosilane, allylmethyldichlorosilane, allyldimethylchlorosilane, allyldimethylmethoxysilane, diallyldichlorosilane, diallyldimethoxysilane, δ-methacryloxypropyltrimethoxysilane, δ-methacryloxypropylmethyldimethoxysilane, δ-methacryloxypropylmethyldimethoxysilane, and the like.

The hydrogenated polybutadiene polymers may be prepared by converting the hydroxyl groups of hydrogenated polymers having terminal hydroxy groups to oxymetal groups such as —ONa or —OK, and then reacting the polymers with an organic halocompound of the formula:

$$CH_2=CH-R^3-Y \quad (3)$$

wherein Y is a halogen atom such as a chlorine or iodine atom, and $R^3$ is a divalent organic group of the formula: $-R^4-$, $-R^4-OCO-$ or $-R^4-CO-$ in which $R^4$ is a divalent hydrocarbon group having 1 to 20 carbon, preferably, an alkylene, cycloalkylene, arylene or aralkylene group, in particular, $-CH_2-$, $-R''-C_6H_5-CH_2-$ in which R'' is a hydrocarbon group having 1 to 20 carbon atoms, and hydrogenated polybutadiene polymers having olefinic groups at the chain ends (which may be referred to as "olefin-terminated hydrogenated polybutadiene polymers") are obtained.

The terminal hydroxyl groups of the hydrogenated polybutadiene polymers having the hydroxyl groups at the chain ends may be converted to the oxymetal groups by reacting such polymers with alkali metals (e.g. sodium, potassium, etc.), metal hydrides (e.g. sodium hydride, etc), metal alkoxides (e.g. sodium methoxide, etc.), alkali metal hydroxides (e.g. sodium hydroxide, potassium hydroxide, etc.), and the like.

The above methods provide the olefin-terminated hydrogenated polybutadiene polymers having substantially the same molecular weight as that of the hydroxy-terminated hydrogenated polybutadiene polymers used as the starting polymers. To obtain polybutadiene polymers having higher molecular weights, prior to the reaction with the organic halocompound (3), the hydroxy-terminated hydrogenated polybutadiene polymers are reacted with polyvalent organic halocompounds having at least 2 halogen atoms in a molecule, and then with the organic halocompound (3). Thereby, the olefin-terminated hydrogenated polybutadiene polymers having the higher molecular weight are obtained.

Specific examples of the organic halocompound (3) are allyl chloride, allyl bromide, vinyl(chloromethyl)benzene, allyl(chloromethyl)benzene, allyl(bromomethyl)benzene, allyl chloromethyl ether, allyl(chloromethoxy)benzene, 1-butenyl chloromethyl ether, 1-hexenyl(chloromethoxy) benzene, allyloxy(chloromethyl)benzene, and the like. Among them, allyl chloride is preferable since it is inexpensive and easily reacts with the polymers.

The reactive silicon-containing groups can be introduced in the olefin-terminated hydrogenated polybutadiene polymers by adding hydrosilane compounds to the polymers in the presence of platinum catalysts like in the case of the preparation of the isobutylene polymers having the reactive silicon-containing groups at the chain ends.

When the unsaturated hydrocarbon polymers having the reactive silicon-containing groups include substantially no unsaturated bonds except aromatic rings in the molecules, the resin compositions comprising such polymers have much better weather resistance than the sealants comprising rubbery polymers such as organic polymers having unsaturated bonds or oxyalkylene polymers. Since such polymers are hydrocarbon polymers, they have good moisture barrier properties and water resistance as well as good adhesion properties onto various inorganic substrates such as glass, aluminum, etc., and provide cured materials having high moisture barrier properties.

The amount of the saturated hydrocarbon polymers having the reactive silicon-containing groups in the curable resin composition of the present invention is preferably at least 10 wt %, more preferably at least 20 wt. %, in particular at least 30 wt %.

The curable resin composition according to the first aspect of the present invention contains a hydrogenated oligomer of an α-olefin (B) for improving extrudability and workability of the curable resin composition at low temperature.

the hydrogenated oligomers of the α-olefins are obtained by hydrogenating polymers which have been prepared from α-olefins having at least 4 carbon atoms. Such oligomers are distinguished by that they have more bulky side chains than oligomers of lower olefins such as ethylene or propylene, or natural mineral or animal oils, and have very unique physical properties.

Because of the bulky side chains, the above hydrogenated oligomers have low pour (flow) points and very low viscosities at low temperature. Thus, the hydrogenated oligomers may improve the extrudability and workability of the curable compositions at low temperature. Furthermore, the hydrogenated oligomers have good compatibility with the saturated hydrocarbon polymers (A), since they are nonpolar hydrocarbon oils comprising carbon and hydrogen atoms. Thus, they may not have adverse effects on adhesion properties, coating properties, stain resistance, and the like of the curable resin composition of the present invention.

Kinds of monomers constituting the hydrogenated oligomers are not limited. Preferable examples of such monomers are linear α-olefins having 4 to 18 carbon atoms (e.g. 1-butene, 1-hexene, 1-octene, 1-nonene, 1-decene, 1-undecene, 1-dodecene, 1-tetradecene, 1-hexadecene, 1-octadecene, etc.), branched α-olefins having 4 to 18 carbon atoms (e.g. 4-methyl-1-pentene, etc.), and the like. Among them, linear α-olefins having 8 to 18 carbon atoms such as 1-octene, 1-decene, 1-dodecene, and the like are preferable, since they provide oligomers having good flowability.

The number average molecular weight of the hydrogenated oligomer is not limited, but is preferably between 200 and 700, in particular between 250 and 500. When the number average molecular weight of the oligomer is less than 200, the heating loss is high, and thus the mechanical properties of the cured materials of the compositions of the present invention may greatly change over time. When the number average molecular weight exceeds 700, the plasticizing effect of the oligomer is insufficient, and the workability of the compositions may deteriorate at low temperature.

The polymerization degree of the hydrogenated oligomer is not limited either, but is preferably between 2 and 10. When the polymerization degree exceeds 10, the plasticizing effect of the oligomer is insufficient, and the workability of the compositions may deteriorate at low temperature.

The molecular weight distribution of the hydrogenated oligomer (Mw/Mn) is not limited, but is preferably between 1 and 1.1. The oligomers having the narrow molecular weight distribution have large plasticizing effects and low heating loss.

The oligomers are preferably hydrogenated after polymerization. When the oligomers have double bonds, the heat resistance and weather resistance of the compositions of the present invention deteriorate. Thus, the hydrogenated oligomers (B) preferably have an iodine value of 5 g-$Br_2$/100 g-oligomer or less, more preferably 1 g-$Br_2$/100 g-oligomer or less, when the iodine value is measured according to ASTM D1159.

A specific example of the hydrogenated oligomer which has the above properties is PAO (IDEMITSU poly-alpha-olefin) manufactured by Idemitsu Petrochemicals, Co., Ltd.

The hydrogenated oligomers of the α-olefins may be used for regulating reaction temperatures and viscosities of reaction systems in place of solvents during the introduction of the reactive silicon-containing groups into the saturated hydrocarbon polymers.

The hydrogenated oligomers of the α-olefins can greatly increase the workability, in particular at low temperature, of the curable resin compositions comprising the saturated hydrocarbon polymers having the reactive silicon-containing groups. Furthermore, the hydrogenated oligomers of the α-olefins do not have any adverse effects on the properties of the cured materials such as mechanical properties, adhesion properties, heat resistance, weather resistance, and the like, since they have good compatibility with the unsaturated hydrocarbon polymers (A).

The amount of the hydrogenated oligomer of the α-olefin (B) in the curable resin composition of the present invention is preferably between 10 and 150 wt. parts, more preferably between 30 and 100 wt. parts, per 100 wt. parts of the saturated hydrocarbon polymer (A).

When the amount of the hydrogenated oligomer of the α-olefin is less than 10 wt. parts, the viscosity of the curable resin compositions may not be sufficiently decreased. When the amount of the hydrogenated oligomer of the α-olefin exceeds 150 wt. parts, the mechanical and adhesion properties of the curable resin compositions tend to deteriorate.

The hydrogenated oligomers of the α-olefins may be used independently or in admixture of two or more of them.

The hydrogenated oligomers of the α-olefins may be used in combination with any other conventional plasticizers. In particular, the plasticizers described in JP-A-1-163255 are preferable, since they have good compatibility with the curable resin compositions of the present invention. Examples of the other plasticizers having good compatibility with the curable resin composition of the present invention are polyvinyl type oligomers (e.g. polybutene, hydrogenated polybutene, atactic polypropylene, etc.), aromatic oligomers (e.g. biphenyl, terphenyl, etc.), hydrogenated polyene oligomers (e.g. hydrogenated liquid polybutadiene, etc.), paraffin oligomers (e.g. paraffinic oils, chlorinated paraffinic oils, etc.), cycloparaffin oligomers (e.g. naphthenic oils, etc.), and the like.

The following plasticizers may be used in combination with the hydrogenated oligomers (B) in such an amount that the adhesion properties, weather resistance and heat resistance and the like of the curable resin compositions of the present invention do not deteriorate:

phthalates (e.g. dibutyl phthalate, diheptyl phthalate, di(2-ethylhexyl) phthalate, butylbenzyl phthalate, di-n-octyl phthalate, diisononyl phthalate, diisodecyl phthalate, diundecyl phthalate, etc.), non-aromatic dibasic acid esters (e.g. di(2-ethylhexyl) adipate, di-n-octyl adipate, diisononyl adipate, diisodecyl adipate, di(2-ethylhexyl) sebacate, etc.), aromatic esters (e.g. di(2-ethylhexyl) tetrahydrophthalate, tri-2-ethylhexyl trimellitate, triisodecyl trimellitate, etc.), aliphatic esters (e.g. butyl oleate, methyl acetylricinoleate, pentaerithritol ester, etc.), esters of polyalkylene glycols (e.g. diethylene glycol benzoate, triethylene glycol dibenzoate, etc.), phosphate esters (e.g. tricresyl phosphate, tributyl phosphate, etc.), epoxy plasticizers (e.g. epoxidized soybean oil, epoxidized linseed oil, etc.), and the like.

They may be used independently or in admixture of two or more of them.

The curable resin composition according to the second aspect of the present invention comprises the saturated hydrocarbon polymer having the reactive silicon-containing groups (A), the saturated hydrocarbon oligomer (C) and the ester plasticizer (D). The use of these two plasticizers (C) and (D) in combination can decrease the viscosity of the polymer (A) so that the handling of the composition becomes easy, and improve the extrudability and workability at low temperature of the composition.

The saturated hydrocarbon oligomers (C) have the close backbone structures to those of the saturated hydrocarbon polymers (A), and good water resistance, heat resistance and weather resistance. Furthermore, the oligomers (C) have good compatibility with the hydrocarbon polymers (A) and hardly bleed out.

Examples of the saturated hydrocarbon oligomers are those described in JP-A-1-163255.

Specific examples of such saturated hydrocarbon oligomers are polyvinyl type oligomers (e.g. polybutene, hydrogenated polybutene, atactic polypropylene, etc.), aromatic oligomers (e.g. biphenyl, terphenyl, etc.), hydrogenated polyene oligomers (e.g. hydrogenated liquid polybutadiene, etc.), paraffinic oils (e.g. paraffinic oils, chlorinated paraffinic oils, etc.), cycloparaffin oligomers (e.g. naphthenic oils, etc.), and the like. The hydrogenated oligomers of the α-olefins (B) used in the composition according to the first aspect of the present invention are also included in the hydrogenated hydrocarbon oligomers. Among these oligomers, paraffinic oils (paraffinic process oils), naphthenic oils (naphthenic process oils), polybutene, hydrogenated polybutene, and hydrogenated oligomers of α-olefins are preferable, since they have good compatibility with the polymer (A), and high plasticizing effects. These plasticizers may be used independently or in admixture of two or more of them.

The saturated hydrocarbon oligomers have good compatibility with the polymer (A) as described above, but among the saturated hydrocarbon oligomers, mineral oils such as paraffinic and naphthenic oils have low flowability at low temperature and may provide curable resin compositions having low workability although they are inexpensive.

The ester plasticizers (D) have relatively good cold resistance, that is, low viscosity and thus good flowability at low temperature. Therefore, they can improve the extrudability and workability at low temperature of the curable resin compositions of the present invention.

However, the ester plasticizers (D) have a larger polarity than the hydrocarbon plasticizers (C). Thus, the ester plasticizers (D) have low compatibility with the non-polar polymers (A) and may decrease the various properties of the curable resin compositions such as the adhesion properties, when only the ester plasticizers are used as the plasticizers for the non-polar polymers (A).

The use of the ester plasticizers in combination with the saturated hydrocarbon oligomers can provide curable resin compositions which do not suffer from the deterioration of adhesion properties, coating properties, stain resistance and the like, while improving extrudability and workability at low temperature of the compositions.

When the ester plasticizers are used in combination with the saturated hydrocarbon plasticizers, the cured materials of the compositions may have increased elongation, which is desirable for the elastic sealants for construction.

Specific examples of the ester plasticizers are phthalates (e.g. dibutyl phthalate, diheptyl phthalate, di(2-ethylhexyl) phthalate, butylbenzyl phthalate, di-n-octyl phthalate, diisononyl phthalate, diisodecyl phthalate, diundecyl phthalate, etc.), non-aromatic dibasic acid esters (e.g. di(2-ethylhexyl) adipate, di-n-octyl adipate, diisononyl adipate, diisodecyl adipate, di(2-ethylhexyl) sebacate, etc.), aromatic esters (e.g. di(2-ethylhexyl) tetrahydrophthalate, tri-2-ethylhexyl trimellitate, triisodecyl trimellitate, etc.), esters of polyalkylene glycols (e.g. diethylene glycol benzoate, triethylene glycol dibenzoate, etc.), phosphate esters (e.g. tricresyl phosphate, tributyl phosphate, etc.), and the like. Among them, the non-aromatic dibasic acid esters are preferable, since they have very good flowability at low temperature. These platicizers may be used independently or in admixture of two or more of them.

The saturated hydrocarbon oligomers and ester oligomers may be used for regulating the reaction temperatures and viscosities of the reaction systems in place of solvents during the introduction of the reactive silicon-containing groups in the saturated hydrocarbon polymers.

The use of the saturated hydrocarbon oligomers and ester oligomers in combination in the curable resin composition of the present invention can greatly increase the workability, in particular at low temperature, of the curable resin composition comprising the saturated hydrocarbon polymer having the reactive silicon-containing groups. Furthermore, the saturated hydrocarbon oligomers and ester oligomers do not have any adverse effects on the properties of the cured materials such as mechanical properties, adhesion properties, heat resistance, weather resistance, and the like.

The amount of the saturated hydrocarbon oligomer (C) is preferably between 10 and 150 wt. parts, more preferably between 30 and 100 wt. parts, per 100 wt. parts of the saturated hydrocarbon polymer (A). When the amount of the saturated hydrocarbon oligomer is less than 10 wt. parts, the compatibility of the components in the composition may not be sufficient. When the amount of the saturated hydrocarbon oligomer exceeds 150 wt. parts, the mechanical properties of the composition tend to deteriorate.

The amount of the ester oligomer (D) is preferably between 10 and 150 wt. parts, more preferably between 30 and 100 wt. parts, per 100 wt. parts of the saturated hydrocarbon polymer (A). When the amount of the ester oligomer is less than 10 wt. parts, the viscosity of the composition may not sufficiently decrease. When the amount of the ester oligomer exceeds 150 wt. parts, the mechanical and adhesion properties of the composition tend to deteriorate.

The weight ratio of the saturated hydrocarbon oligomer (C) to the ester oligomer (D) is preferably between 0.2:1 and 15:1, more preferably between 1:1 and 5:1. When the weight ratio is less than 0.2:1, the adhesion properties of the composition may deteriorate. When the weight ratio exceeds 15:1, the workability at low temperature of the composition may not be sufficiently improved.

The number average molecular weights of the saturated hydrocarbon oligomers and ester oligomers are not limited, and are preferably between 200 and 1000, more preferably between 300 and 500. When the number average molecular weights are less than 200, the heating loss is large, and thus the mechanical properties of the cured materials of the compositions of the present invention may greatly change over time. When the number average molecular weights exceed 1000, the plasticizing effects of the oligomers are insufficient, and the workability of the compositions may deteriorate at low temperature.

The saturated hydrocarbon oligomers and ester oligomers may be used together with any other conventional plasticizers.

The curable resin compositions of the present invention may optionally contain various fillers. Specific examples of the fillers are wood meal, pulp, cotton chips, asbestos, glass fiber, carbon fiber, mica, walnut shell flour, graphite, diatomaceous earth, china clay, humed silica, precipitated silica, silica, carbon black, calcium carbonate, clay, talc, titanium oxide, magnesium carbonate, quartz, aluminum fine power, flint powder, zinc powder, and the like. Among them, precipitated silica, humed silica, carbon black, calcium carbonate, titanium oxide and talc are preferable. In particular, glued calcium carbonate which is treated with about 3 wt. % of a fatty acid ester as a surface treating agent (for example, SEELETS manufactured by MARUO CALCIUM Co., Ltd.) is preferably used since it can significantly improve the workability of the curable resin compositions, and provide the compositions having good thixotropy and stream-breaking properties. The above additives may be used independently or in admixture of two or more of them.

When the fillers are used, the amount of the fillers is between 1 and 500 wt. parts, preferably between 50 and 200 wt. parts, per 100 wt. parts of the saturated hydrocarbon polymer (A).

The curable resin compositions of the present invention needs moisture for condensation curing the saturated hydrocarbon polymers (A). Thus, water or hydrates of metal salts may be added to the composition as sources for supplying moisture.

Any commercially available hydrates of metal salts may be used. For example, hydrates of alkaline earth metal salts or other metal salts may be used.

Specific examples of the hydrates of the metal salts are as follows:

$Al_2O_3.H_2O$, $Al_2O_3.3H_2O$, $Al_2(SO_4)_3.18H_2O$, $Al_2(C_2O_4)_3.4H_2O$, $AlNa(SO_4)_2.12H_2O$, $AlK(SO_4)_2.12H_2O$, $BaCl_2.2H_2O$, $Ba(OH)_2.8H_2O$, $CaSO_4.2H_2O$, $CaS_2O_3.6H_2O$, $Ca(NO_3)_2.4H_2O$, $CaHPO_4.2H_2O$, $Ca(C_2O_4).H_2O$, $Co(NO_3)_2.6H_2O$, $Co(CH_3COO)_2.4H_2O$, $CuCl_2.2H_2O$, $CuSO_4.5H_2O$, $FeCl_2.4H_2O$, $FeCl_3.6H_2O$, $FeSO_4.7H_2O$, $Fe(NH_4)(SO_4)_2.12H_2O$, $K_2CO_3.1.5H_2O$, $KNaCO_3.6H_2O$, $LiBr.2H_2O$, $Li_2SO_4.H_2O$, $MgSO_4.H_2O$, $MgSO_4.7H_2O$, $MgHPO_4.7H_2O$, $Mg_3(PO_4)_2.8H_2O$, $MgCO_3.3H_2O$, $Mg_4(CO_3)_3(OH)_2.3H_2O$, $MoO_3.2H_2O$, $NaBr.2H_2O$, $Na_2SO_3.7H_2O$, $Na_2SO_4.10H_2O$, $Na_2S_2O_3.5H_2O$, $Na_2S_2O_6.2H_2O$, $Na_2B_4O_7.10H_2O$, $NaHPHO_3.2.5H_2O$, $Na_3PO_4.12H_2O$, $Na_2CO_3.H_2O$, $Na_2CO_3.7H_2O$, $Na_2CO_3.10H_2O$, $CH_3COONa.3H_2O$, $NaHC_2O_4.H_2O$, $NiSO_4.6H_2O$, $NiC_2O_4.2H_2O$, $SnO_2.nH_2O$, $NiC_2O_4.2H_2O$, $Sn(SO_4)_2.2H_2O$, $ZnSO_3.2H_2O$, $ZnSO_4.7H_2O$, $Zn_3(PO_4)_2.4H_2O$, $Zn(CH_3COO)_2.2H_2O$, etc.

Among them, the hydrates of the alkali metal salts and alkaline earth metal salts are preferable. Specific examples of such hydrates are $MgSO_4.7H_2O$, $Na_2CO_3.10H_2O$, $Na_2SO_4.10H_2O$, $Na_2S_2O_3.5H_2O$, $Na_3PO_4.12H_2O$, $Na_2B_4O_7.10H_2O$, etc.

Water is preferably used in an amount of between 0.01 and 25 wt. parts, more preferably between 0.05 and 15 wt.

parts, in particular between 0.2 and 5 wt. parts, per 100 wt. parts of the saturated hydrocarbon polymer (A).

The hydrate of the metal salt is preferably used in an amount of between 0.01 and 50 wt. parts, more preferably between 0.1 and 30 wt. parts, in particular 1 and 10 wt. parts, per 100 wt. parts of the saturated hydrocarbon polymer (A).

Water and the hydrates of the metal salts may be used independently or in admixture of two or more of them.

In addition to the above described plasticizers, fillers and moisture sources, the curable resin composition of the present invention may contain other additives, if necessary.

Examples of such additives are curing catalysts for accelerating the silanol condensation reaction, property-adjusting agents for regulating tensile properties of the cured material of the composition, adhesion improvers, anti-aging agents, radical polymerization inhibitors, UV light absorbers, metal-deactivating agents, antiozonants, light stabilizers, photo-curable resins, anti-sagging agents, phosphor base peroxide-decomposers, lubricants, pigments, foaming agents, and the like.

Specific examples of such additives are described in JP-B-4-69659, JP-B-7-108928, JP-A-63-254149 and JP-A-64-22904.

The effects of the addition of the hydrogenated oligomers of the α-olefins or the combination of the saturated hydrocarbon oligomers and ester oligomers can be attained even when the various additives are added to the curable resin compositions. That is, the addition of the oligomer(s) can improve the workability, in particular at low temperature, of the sealants, when the curable resin compositions of the present invention are used as the sealants for construction or insulating glass units.

The present invention will be illustrated by the following Examples, which will not limit the scope of the present invention in any way.

PREPARATION EXAMPLE 1

An interior of a pressure-resistant 500 ml glass vessel equipped with a three-way cock was replaced nitrogen, and then ethylcyclohexane (54 ml) which has been dried over Molecular Sieves 3A overnight, toluene (126 ml) which had been dried over Molecular Sieves 3A overnight, and p-DCC of the following formula (0.76 g, 3.28 mmol) were supplied into the vessel using a syringe:

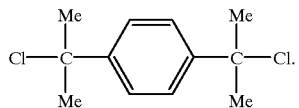

Then, a liquid supplying glass tube equipped with a needle valve, which contained an isobutylene monomer (56 ml), was connected to the three-way cock. After cooling the polymerization vessel to −70° C. in a dry ice-ethanol bath, and evacuating the vessel with a vacuum pump, the isobutylene monomer was supplied in the vessel from the glass tube, and then the internal pressure of the vessel was increased to atmospheric pressure by supplying nitrogen through one way of the three-way cock.

2-Methylpyridine (0.112 g, 1.2 mmol) was added, and then titanium tetrachloride (1.65 ml, 15.1 mmol) was added to start the polymerization. After 70 minute polymerization, ally trimethylsilane (0.89 g, 7.9 mmol) was added to introduce allyl groups to the polymer chain ends. After 120 minute reaction, the reaction mixture was washed with water (200 ml each) four times, the solvent was evaporated off, and an isobutylene polymer having terminal allyl groups was obtained.

Next, the isobutylene polymer having the terminal allyl groups (40 g) was dissolved in n-heptane (20 ml) and heated up to about 70° C. Then, methyldimethoxysilane (1.5 eq/vinyl group) and a complex of platinum with vinylsiloxane ($1 \times 10^{-4}$ eq/vinyl group) were added to effect the hydrosilylation reaction. The reaction was monitored with FT-IR. The absorption due to olefins at 1640 cm$^{-1}$ disappeared in about 4 hours.

The reaction mixture was concentrated under reduced pressure, and a desired isobutylene polymer having reactive silicon-containing groups at both chain ends of the following formula was obtained:

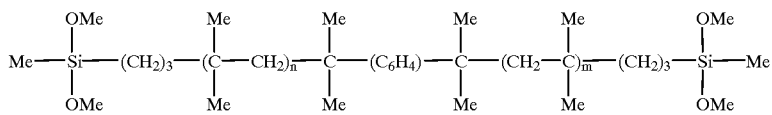

The yield of the polymer was calculated from the produced amount, Mn and Mw/Mn were measured by the GPC method, and the terminal structures of the polymer were determined by measuring and comparing intensities of resonance signals for protons contained in the structures by the $^1$H-NMR method (300 MHz) in CDCl$_3$ using Gemini 300 (300 MHz for $^1$H) (manufactured by Varian) (protons of the initiator: 6.5–7.5 ppm; methyl protons bonded to the silicon atoms of the polymer chain ends: 0.0–0.1 ppm; and methoxy protons: 3.4–3.5 ppm).

FT-IR was measured with IR-408 (manufactured by Shimadzu Corporation). GPC was measured using LC Module 1 (manufacture by Waters) as a liquid supplying system, and Shodex K-804 (manufactured by Showa Denko Co., Ltd.) as a column. The molecular weights are relative molecular weights in relation to standard polystyrene.

Mn was 17,501, and Mw/Mn was 1.14. The number of terminal silyl functional groups (Fn) was 1.91 per one molecule of the isobutylene polymer.

PREPARATION EXAMPLE 2

An isobutylene polymer having reactive silicon-containing groups was prepared in the same manner as in Preparation Example 1 except that the amounts of p-DCC, 2-methylpyridine, and allyltrimethylsilane were changed to 1.16 g (5.02 mmol), 0.093 g (1.0 mmol), and 1.22 g (10.8 mmol), respectively.

Mn was 11,445, Mw/Mn was 1.23, and Fn (silyl) was 1.76.

EXAMPLES 1–5 AND COMPARATIVE EXAMPLE 1

To 100 wt. parts of the polymer prepared in Preparation Example 1 as a saturated hydrocarbon polymer (A), PAO 5002 or PAO 5004 (manufactured by IDEMITSU PETROCHEMICAL, Co., Ltd.) as a hydrogenated oligomer of an α-olefin (B), di(2-ethylhexyl) adipate (SANSOCIZER DOA manufactured by SHIN-NIPPON RIKA Co., Ltd.) as an ester plasticizer, and a process oil having paraffinic groups with low flowability at a low temperature (DIANA PROCESS PS-32 manufactured by IDEMITSU KOSAN Co., Ltd.) were added in amounts shown in Table 1.

Furthermore, glued calcium carbonate (SEELETS 200 manufactured by MARUO CALCIUM Co., Ltd.) (50 wt. parts), glued calcium carbonate (MC-5 manufactured by MARUO CALCIUM CO., Ltd.) (50 wt. parts), heavy calcium carbonate (SOFTON 3200 manufactured by SHIRAISHI CALCIUM Co., Ltd.) (40 wt. parts), an epoxy resin (EPIKOTE 828 manufactured by YUKA SHELL EPOXY Co., Ltd.) (5 wt. parts), an anti-sagging agent (DISPARLON #305 manufactured by KUSUMOTO KASEI Co., Ltd.) (3 wt. parts), a photopolymerization initiator (ARONIX M-309 manufactured by TOA GOSEI Co., Ltd.) (3 wt. parts), a hindered phenol antioxidant (IRGANOX 1010 manufactured by NIPPON CIBA-GEIGY Co., Ltd.) (1 wt. part), a benzotriazole UV light absorber (TINUVIN 327 manufactured by NIPPON CIBA-GEIGY Co., Ltd.) (1 wt. part), a hindered amine light stabilizer (SANOL LS-770 manufactured by SANKYO Co., Ltd.) (1 wt. part), a carbon black reinforcing material (CARBON BLACK #30 manufactured by MITSUBISHI CHEMICAL Co., Ltd.), and $H_2O$ or $Na_2SO_4 \cdot 10H_2O$ (manufactured by WAKO JUNYAKU Co., Ltd.) (5 wt. parts) as a moisture source were added to the above mixture and kneaded with a small three-roll paint roll mill three times, and a primary agent was obtained.

Separately, the following agents were kneaded with a small homogenizer, and a curing agent was obtained:

tin octylate (NEOSTAN U-28 manufactured by NITTO KASEI Co., Ltd.) (3 wt. parts), laurylamine (manufactured by WAKO JUNYAKU Co., Ltd.) (0.75 part), a process oil having paraffinic groups (DIANA PROCESS PS-32 manufactured by IDEMITSU KOSAN Co., Ltd.) (6.25 wt. parts), heavy calcium carbonate (SOFTON 3200 manufactured by SHIRAISHI CALCIUM Co., Ltd.), and titanium oxide (TIPAQUE R-820 manufactured by ISHIHARA SANGYO Co., Ltd.) (10 wt. parts).

The primary agent and curing agent were dried in a drier at 5° C. for 24 hours or longer, and then they were mixed in a weight ratio of 100:10 (primary agent:curing agent), and subjected to the extrusion test according to JIS A 5758-1992 with the number of samples of 3.

The viscosity of the composition was measured with a BS type viscometer (manufactured by TOKYO KEIKI Co., Ltd. Rotor No. 7) in a constant-temperature room at 23° C., 60% RH.

The tensile adhesion test of the composition was carried out as follows:

Glass substrates were assembled in the "H" figure by a method for preparing a sample for tensile adhesion property measurement according to JIS A 5758-1992 (Sealing Materials for Construction). The primary agent and curing agent in a weight ratio of 100:10 were well kneaded and filled in the assembled glass substrates, followed by curing in an oven. The cured material was aged at 23° C. for 7 days and then at 50° C. for 7 days.

A piece of float glass was used as a test specimen, and coated with a primer (D-2 manufactured by TORAY DOW CORNING) one time.

The tensile test was carried out using SHIMADZU AUTOGRAPH AG-2000A at in a constant-temperature room kept at 23° C. and 60±5% RH, at a pulling rate of 50 mm/min.

The compositions of primary agents, extrudability at 5° C., viscosity, and results of the tensile adhesion test are shown in Table 1. In Table 1, M100, M150, TB and EB stand for "100% tensile stress", "150% tensile stress", "maximum tensile stress" and "elongation at break (maximum load)", respectively.

TABLE 1

| Example No. | | Ex. 1 | Ex. 2 | Ex. 3 | Ex. 4 | Ex. 5 | Comp. Ex. 1 |
|---|---|---|---|---|---|---|---|
| Primary agent | | | | | | | |
| Polymer of Prep. Ex. 1 | | 100 | 100 | 100 | 100 | 100 | 100 |
| PAO 5002 | | 60 | 60 | — | 110 | — | — |
| PAO 5004 | | — | — | 60 | — | — | — |
| DOA | | — | — | — | — | 40 | — |
| PS-32 | | 50 | 50 | 50 | — | 70 | 110 |
| SEELETS 200 | | 50 | 50 | 50 | 50 | 50 | 50 |
| MC-5 | | 50 | 50 | 50 | 50 | 50 | 50 |
| SOFTON 3200 | | 40 | 40 | 40 | 40 | 40 | 40 |
| EPIKOTE 828 | | 5 | 5 | 5 | 5 | 5 | 5 |
| DISPARON #305 | | 3 | 3 | 3 | 3 | 3 | 3 |
| ARONIX M-309 | | 3 | 3 | 3 | 3 | 3 | 3 |
| IRGANOX 1010 | | 1 | 1 | 1 | 1 | 1 | 1 |
| TINUVIN 327 | | 1 | 1 | 1 | 1 | 1 | 1 |
| SANOL LS-770 | | 1 | 1 | 1 | 1 | 1 | 1 |
| CARBON BLACK #30 | | 0.2 | 0.2 | 0.2 | 0.2 | 0.2 | 0.2 |
| $Na_2SO_4 \cdot 10H_2O$ | | 5 | — | 5 | 5 | 5 | 5 |
| $H_2O$ | | — | 5 | — | — | — | — |
| Extrudability at 5° C. (sec.) | | 2.8 | 2.6 | 4.8 | 2.2 | 2.7 | 5.3 |
| Viscosity | 1 rpm | 25200 | 30000 | 34800 | 18200 | 33000 | 68400 |
| | 2 rpm | 13800 | 17100 | 22200 | 10100 | 18000 | 36600 |
| | 10 rpm | 3960 | 5280 | 5520 | 2860 | 4920 | 9480 |
| | 1/10 viscosity ratio | 6.4 | 6.3 | 6.3 | 6.4 | 6.7 | 7.2 |
| | 2/10 viscosity ratio | 3.5 | 4.0 | 4.0 | 3.5 | 3.7 | 3.9 |

TABLE 1-continued

| Example No. | | Ex. 1 | Ex. 2 | Ex. 3 | Ex. 4 | Ex. 5 | Comp. Ex. 1 |
|---|---|---|---|---|---|---|---|
| Tensile adhesion test | M100 (kgf/cm$^2$) | 1.9 | 1.5 | 2.1 | 1.5 | 1.4 | 1.8 |
| | M150 (kgf/cm$^2$) | 2.5 | 2.1 | 2.7 | 2.1 | 2.1 | 2.3 |
| | TB (kgf/cm$^2$) | 4.7 | 3.8 | 5.3 | 4.0 | 5.2 | 4.1 |
| | EB (%) | 430 | 350 | 450 | 400 | 590 | 420 |
| | Bond failure | *1) | *1) | *1) | *1) | *1) | *1) |

Notes:
*1) 100% Cohesive failure.

The composition of Comparative Example 1 had good workability in summer, since it contained SEELETS 200 as a filler, which has good thixotropic properties and stream-breaking properties. However, DIANA PROCESS used as the plasticizer contains waxy components. Thus, the composition had low flowability at low temperature and its extrudability at 5° C. was larger than 5 seconds. That is, its workability in winter is not good.

The compositions of Examples 1–4 contained the hydrogenated oligomers of α-olefins (B) as plasticizers according to the present invention. PAO 5002 and PAO 5004, which are the hydrogenated oligomers of α-olefins (B) and used in Examples 1 to 4, are synthetic oils comprising hydrogenated oligomers of 1-decene having oligomerization degrees of 1 to 5. PAO 5002 and PAO 5004 have high plasticizing effects and good flowability at low temperature, since they have narrow molecular weight distribution of less than 1.1 (Mw/Mn), and structures having relatively short backbones and bulky side chains.

Accordingly, the compositions of Examples 1 to 4 containing PAO 5002 or PAO 5004 had better extrudability at 5° C. than that of Comparative Example 1, that is, better workability at low temperature. In particular, the composition of Example 4 in which all PS-32 was replaced with PAO 5002 had the extrudability at 5° C. of 2.2 seconds, and good workability in winter.

It is understood from the results of the viscosity measurement using a BS type viscometer that the use of PAO 5002 of PAO 5004 in place of PS-32 improves the workability of the curable resin compositions. That is, all the compositions of Examples 1–4 had lower viscosities than that of Comparative Example 1.

It is understood from the results of the H type tensile adhesion test that the use of the hydrogenated oligomers of the α-olefins does not have any adverse effects on the mechanical properties of the cured materials and the adhesion properties of the compositions.

Comparison of Examples 1 and 2 indicates that the difference of the moisture sources, that is, water and Na$_2$SO$_4$.10H$_2$O, has little influence on the workability at low temperature.

The composition of Example 5 contained the saturated hydrocarbon oligomer (C), that is, DIANA PROCESS PS-32, and the ester plasticizer (D), that is, SANSOCIZER DOA, in combination.

Comparison of Example 5 and Comparative Example 1 shows that the addition of the ester plasticizer can greatly improve the viscosity and extrudability at 5° C. It is understood from the results of the H type tensile adhesion test that the composition of Example 5 had good adhesion properties.

Furthermore, the elongation at break (maximum load) was 420% in Comparative Example 1 in which the saturated hydrocarbon oligomer was used alone, but it increased to 590% by the co-use of the ester plasticizer in Example 5.

Such high elongation properties are preferable for the elastic sealing materials.

EXAMPLES 6–10 AND COMPARATIVE EXAMPLES 2 AND 3

To 100 wt. parts of the polymer prepared in Preparation Example 2 as a saturated hydrocarbon polymer (A), PAO 5002 (manufactured by IDEMITSU PETROCHEMICAL, Co., Ltd.) as a hydrogenated oligomer of an α-olefin (B), di(2-ethylhexyl) adipate (SANSOCIZER DOA manufactured by SHIN-NIPPON RIKA Co., Ltd.), di(2-ethylhexyl) sebacate (SANSOCIZER DOS manufactured by SHIN-NIPPON RIKA Co., Ltd.) or di(2-ethylhexyl tetrahydrophthalate (SANSOCIZER DOTP manufactured by SHIN-NIPPON RIKA Co., Ltd.) as an ester plasticizer, and a process oil having paraffinic groups with low flowability at a low temperature (DIANA PROCESS PS-32 manufactured by IDEMITSU KOSAN Co., Ltd.) were added in amounts shown in Table 2.

Furthermore, glued calcium carbonate (EDS-D10A manufactured by SHIRAISHI KOGYO Co., Ltd.) (50 wt. parts), heavy calcium carbonate (PO 320 B10 manufactured by SHIRAISHI CALCIUM Co., Ltd.) (180 wt. parts), talc (TALC LMR manufactured by FUJI TALC KOGYO Co., Ltd.) (100 wt. parts), nickel dimethyldithiocarbamate as a light stabilizer (SANDANT NBC manufactured by SAN-SHIN KAGAKU Co., Ltd.) (3 wt. parts), an anti-sagging agent (DISPARON #305 manufactured by KUSUMOTO KASEI Co., Ltd.) (5 wt. parts), a hindered phenol antioxidant (IRGANOX 1010 manufactured by NIPPON CIBA-GEIGY Co., Ltd.) (1 wt. part), a salicylate UV light absorber (SUMISORB 400 manufactured by SUMITOMO CHEMICAL Co., Ltd.) (1 wt. part), a hindered amine light stabilizer (SANOL LS-765 manufactured by SANKYO Co., Ltd.) (1 wt. part), a photocurable resin (ARONIX M-400 manufactured by TOA GOSEI Co., Ltd.) (3 wt. parts), γ-glycidoxypropyltrimethoxysilane (SILANE COUPLING AGENT A-187 manufactured by NIPPON UNICAR) (2 wt. parts), and γ-isocyanate-propyltriethoxysilane (SILANE COUPLING AGENT Y-9030 manufactured by NIPPON UNICAR) (4 wt. parts) were added to the above mixture and thoroughly kneaded with a three-roll paint roll mill, and a primary agent was obtained.

Separately, the following agents were kneaded with a hand in a disposable cup and then kneaded with an Excel Autohomogenizer (manufactured by NIPPON SEIKI SEI-SAKUSHO Co., Ltd.) at 10,000 rpm for 10 minutes each three times and a curing agent was obtained:

a process oil having paraffinic groups (DIANA PROCESS PS-32 manufactured by IDEMITSU KOSAN Co., Ltd.) (10 wt. parts), heavy calcium carbonate (SNOWLITE SS manufactured by MARUO CALCIUM Co., Ltd.) (20 wt. parts), a curing catalyst (U-220 manufactured by NITTO KASEI Co., Ltd.), laurylamine (manufactured by WAKO JUNYAKYU Co., Ltd.) (2 wt. parts), carbon black (CARBON BLACK #30 manufactured by MITSUBISHI CHEMICAL Co., Ltd.) (2.5 wt. parts), and $Na_2SO_4 \cdot 10H_2O$ (manufactured by WAKO JUNYAKU Co., Ltd.) (4 wt. parts).

The viscosity was measured in the same manner as described above.

The tensile adhesion test was carried out according to JIS A 5787-1992 in the same way as described above except that the weight ratio of the primary agent to the curing agent was 129:10, and no primer was coated.

The compositions of primary agents, viscosity, and results of the tensile adhesion test are shown in Table 2. In Table 2, M30, M50, TB and EB stand for "30% tensile stress", "50% tensile stress", "maximum tensile stress" and "elongation at break (maximum load)", respectively.

The results of the H type tensile adhesion test indicate that the use of the hydrogenated oligomer of the α-olefin as the plasticizer does not have any adverse effects on the mechanical properties of the cured materials, and the adhesion properties of the curable resin compositions.

The composition of Comparative Example 3 contained only the ester plasticizer (D) as the plasticizer. When only an ester plasticizer is used as a plasticizer, a curable resin composition has low adhesion properties due to bleeding out and thus it shows 100% adhesive (interface) failure as shown in Table 2, since the ester plasticizer has low compatibility with the saturated hydrocarbon polymer (A).

However, when the ester plasticizers are used in combination with the saturated hydrocarbon oligomers as in Examples 8, 9 and 10, the compositions have low viscosities, and most of them show the cohesive failure.

TABLE 2

| Example No. | | Ex. 6 | Ex. 7 | Ex. 8 | Ex. 9 | Ex. 10 | Comp. Ex. 2 | Comp. Ex. 3 |
|---|---|---|---|---|---|---|---|---|
| Primary agent | | | | | | | | |
| Polymer of Prep. Ex. 2 | | 100 | 100 | 100 | 100 | 100 | 100 | 100 |
| PAO 5002 | | 60 | 90 | — | — | — | — | — |
| DOA | | — | — | 60 | — | — | — | 90 |
| DOS | | — | — | — | 60 | — | — | — |
| DOTP | | — | — | — | — | 60 | — | — |
| PS-32 | | 30 | — | 30 | 30 | 30 | 90 | — |
| EDS-D10A | | 50 | 50 | 50 | 50 | 50 | 50 | 50 |
| PO 320 B10 | | 180 | 180 | 180 | 180 | 180 | 180 | 180 |
| TALC KNR | | 100 | 100 | 100 | 100 | 100 | 100 | 100 |
| SANDANT NBC | | 3 | 3 | 3 | 3 | 3 | 3 | 3 |
| DISPARON #305 | | 5 | 5 | 5 | 5 | 5 | 5 | 5 |
| IRGANOX 1010 | | 1 | 1 | 1 | 1 | 1 | 1 | 1 |
| SUMISORB 400 | | 1 | 1 | 1 | 1 | 1 | 1 | 1 |
| SANOL LS-765 | | 1 | 1 | 1 | 1 | 1 | 1 | 1 |
| ARONIX M-400 | | 3 | 3 | 3 | 3 | 3 | 3 | 3 |
| A-187 | | 2 | 2 | 2 | 2 | 2 | 2 | 2 |
| Y-9030 | | 4 | 4 | 4 | 4 | 4 | 4 | 4 |
| Viscosity | 1 rpm | 20500 | 17300 | 23880 | 23560 | 29290 | 39800 | 17920 |
| | 2 rpm | 11700 | 9600 | 13820 | 13820 | 17620 | 22900 | 10370 |
| | 10 rpm | 3580 | 2850 | 4370 | 4300 | 5810 | 7630 | 3280 |
| | 1/10 viscosity ratio | 5.7 | 6.1 | 5.5 | 5.5 | 5.0 | 5.2 | 5.5 |
| | 2/10 viscosity ratio | 3.3 | 3.4 | 3.2 | 3.2 | 3.0 | 3.0 | 3.2 |
| Tensile adhesion test | M30 (kgf/cm$^2$) | 4.3 | 4.4 | 4.0 | 3.9 | 4.1 | 3.9 | — |
| | M50 (kgf/cm$^2$) | 6.3 | 6.5 | 5.9 | 5.9 | 6.1 | 5.6 | — |
| | TB (kgf/cm$^2$) | 7.6 | 7.5 | 7.2 | 7.2 | 7.4 | 7.9 | 3.0 |
| | EB (%) | 68 | 64 | 70 | 66 | 70 | 88 | 25 |
| | Bond failure | *1) | *1) | *2) | *3) | *4) | *1) | *5) |

Notes:
*1) 100% Cohesive failure.  *2) 85% Cohesive failure/15% thin layer failure.
*3) 95% Cohesive failure/5% thin layer failure.  *4) 80% Cohesive failure/20% thin layer failure.
*5) 100% Adhesive (interface) failure.

It is understood from the results of the viscosities measured with the BS type viscometer that the use of PAO 5002, which is a hydrogenated oligomer of an α-olefin, in place of PS-32 greatly decreased the viscosity of the composition. That is, the compositions of Examples 6 and 7 had the lower viscosity and better dischargeability from an applicator than that of Comparative Example 2. Furthermore, the thixotropic properties which are expressed by a ratio of a viscosity at 1 rpm or 2 rpm to that at 10 rpm (1/10 viscosity ratio or 2/10 viscosity ratio) was higher in Examples 6 and 7 than in Comparative Example 2. This means that the compositions of Examples 6 and 7 had also better sagging and stream-breaking properties than that of Comparative Example 2.

What is claimed is:

1. A curable resin composition comprising:

(A) saturated hydrocarbon polymer having at least one hydroxyl or hydrolyzable group bonded to a silicon atom and is crosslinkable through the formation of a siloxane bond, in a molecule and (B) a hydrogenated oligomer of a linear α-olefin.

2. A curable resin composition as claimed in claim 1, wherein said saturated hydrocarbon polymer (A) has a number average molecular weight of between 500 and 50,000, and hydrolyzable silyl groups of the formula (1):

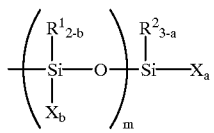

(1)

wherein $R^1$ and $R^2$ are the same or different and represent a hydrogen atom, a $C_{1-20}$ alkyl group, a $C_{6-20}$ aryl group, a $C_{7-20}$ aralkyl group or a triorganosiloxy group of the formula: $(R')_3SiO-$ in which three R' groups are the same or different and represent a hydrogen atom or a $C_{1-20}$ alkyl group which may be substituted; the X groups are the same or different and represent a hydroxyl group or a hydrolyzable group; a is 0, 1, 2 or 3; and b is 0, 1 or 2, provided that the sum of a and b is not 0; and m is an integer of 0 to 19, at backbone chain ends and/or side chain ends.

3. A curable resin composition as claimed in claim 2, wherein X is an alkoxy group.

4. A curable resin composition as claimed in claim 1, wherein said saturated hydrocarbon polymer (A) is a polymer comprising at least 50 wt. % of repeating units derived from isobutylene.

5. A curable resin composition as claimed in claim 1, wherein said hydrogenated oligomer of the α-olefin (B) is an oligomer comprising an α-olefin having 4 to 18 carbon atoms, and having an oligomerization degree of between 2 and 10 and substantially no carbon—carbon unsaturated bond.

6. A curable resin composition as claimed in claim 1, wherein said α-olefin is at least one compound selected from the group consisting of 1-octene, 1-nonene, 1-decene, 1-undecene and 1-dodecene.

7. A curable resin composition as claimed in claim 1, wherein said hydrogenated oligomer of the α-olefin (B) has a number average molecular weight of between 200 and 700 and a molecular weight distribution (Mw/Mn) of between 1 and 1.1.

8. A curable resin composition as claimed in claim 1, wherein the amount of said hydrogenated oligomer of the α-olefin (B) is between 10 and 150 wt. parts per 100 wt parts of said saturated hydrocarbon polymer (A).

9. A sealing composition for construction comprising a curable resin composition as claimed in claim 1.

10. A sealing composition for insulating glass units comprising a curable resin composition as claimed in claim 1.

11. A curable resin composition comprising:
(A) saturated hydrocarbon polymer having at least one having at least one reactive silicon-containing group in a molecule,
(B) a saturated hydrocarbon oligomer, and
(C) an ester plasticizer.

12. A curable resin composition as claimed in claim 11, wherein said saturated hydrocarbon polymer (A) has a number average molecular weight of between 500 and 50,000, and hydrolyzable silyl groups of the formula (1):

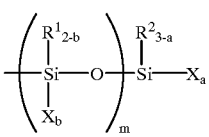

(1)

wherein $R^1$ and $R^2$ are the same or different and represent a hydrogen atom, a $C_{1-20}$ alkyl group, a $C_{6-20}$ aryl group, a $C_{7-20}$ aralkyl group or a triorganosiloxy group of the formula: $(R')_3SiO-$ in which three R' groups are the same or different and represent a hydrogen atom or a $C_{1-20}$ alkyl group which may be substituted; the X groups are the same or different and represent a hydroxyl group or a hydrolyzable group; a is 0, 1, 2 or 3; and b is 0, 1 or 2, provided that the sum of a and b is not 0; and m is an integer of 0 to 19, at backbone chain ends and/or side chain ends.

13. A curable resin composition as claimed in claim 12, wherein X is an alkoxy group.

14. A curable resin composition as claimed in claim 11, wherein said saturated hydrocarbon polymer (A) is a polymer comprising at least 50 wt. % of repeating units derived from isobutylene.

15. A curable resin composition as claimed in claim 11, wherein said saturated hydrocarbon oligomer (C) is at least one compound selected from the group consisting of paraffinic process oils, naphthenic process oils, polybutene, hydrogenated polybutene and hydrogenated oligomers of α-olefins.

16. A curable resin composition as claimed in claim 11, wherein said ester plasticizer (D) is a non-aromatic dibasic acid ester.

17. A curable resin composition as claimed in claim 11, wherein the amount of said saturated hydrocarbon oligomer (C) is between 10 and 150 wt. parts, and the amounts of said ester plasticizer (D) is between 10 and 150 wt. parts, both per 100 wt. parts of said saturated hydrocarbon polymer (A).

18. A sealing compositions for construction comprising a curable resin composition as claimed in claim 11.

19. A sealing composition for insulating glass units comprising a curable resin composition as claimed in claim 11.

* * * * *